United States Patent [19]

Downs

[11] Patent Number: 5,266,288

[45] Date of Patent: Nov. 30, 1993

[54] SO₂ CONTROL USING MOVING GRANULAR BEDS

[75] Inventor: William Downs, Alliance, Ohio

[73] Assignee: The Babcock & Wilcox Company, New Orleans, La.

[21] Appl. No.: 926,492

[22] Filed: Aug. 7, 1992

Related U.S. Application Data

[62] Division of Ser. No. 500,652, Mar. 28, 1990, Pat. No. 5,167,931.

[51] Int. Cl.⁵ .......................... B01J 8/00; C01B 17/00
[52] U.S. Cl. ............................ 423/244.08; 423/244.07
[58] Field of Search ............... 423/239, 244.07, 244.08

[56] References Cited

U.S. PATENT DOCUMENTS

| | | | |
|---|---|---|---|
| 3,976,747 | 8/1976 | Shale | 423/244.08 |
| 4,442,079 | 4/1984 | Donnelly et al. | 423/239 |
| 4,442,080 | 4/1984 | Donnelly et al. | 423/239 |
| 4,663,136 | 5/1987 | Furlong | 423/244.08 |
| 4,764,348 | 8/1988 | Furlong | 422/178 |

Primary Examiner—Gregory A. Heller
Attorney, Agent, or Firm—Robert J. Edwards; Vytas R. Matas; Daniel S. Kalka

[57] ABSTRACT

A method and apparatus of scrubbing acid gas from flue gas comprises slats which define a moving bed of scrubbing material which is capable of reacting with the acid gas to form reaction products on particles of the scrubbing material. Flue gas from a boiler or other sources of flue gas is passed through the moving bed of scrubbing material. The scrubbing material is sprayed with water to the saturation point for increasing the rate of reaction between the reaction gas on the scrubbing material. The scrubbing material leaving the bottom of the moving bed is subjected to a separation step which removes the reaction products as fine dust which is disgarded, and returns the now regenerated particles of scrubbing material to the top of the moving bed.

11 Claims, 11 Drawing Sheets

SO₂ CONTROL USING MOVING GRANULAR BEDS

This is a division of application Ser. No. 07/500,652 filed Mar. 28, 1990 now U.S. Pat. No. 5,167,931.

FIELD AND BACKGROUND OF THE INVENTION

The present invention relates in general to the scrubbing of flue gases from furnaces and other sources of such gases, and in particular to a new and useful method and apparatus of scrubbing acid gases such as $SO_2$ and HCl from flue gases using a moving bed of granular scrubbing material.

A moving bed of scrubbing material for removing sulfur oxides from flue gases is disclosed in U.S. Pat. No. 3,976,747. Before passing the flue gases through the moving bed, the flue gases are conditioned by adding water thereto. The water in the flue gases then condenses on particles of the scrubbing material in the bed for increasing the rate of reaction between the sulfur oxides and particles of the scrubbing material.

U.S. Pat. Nos. 4,663,136 and 4,764,348 disclose a similar process which, however, utilizes fixed beds of the scrubbing material, to which the flue gases are supplied. The scrubbing material is cool so that water in the flue gas condenses on particles of the scrubbing material.

A need remains for an improved method and apparatus for scrubbing acid gases such as sulfur oxides from flue gases which is efficient and economical, and in particular a method and apparatus which can be retrofit into existing plants in a convenient and economical manner.

SUMMARY OF THE INVENTION

The present invention comprises a method and apparatus for scrubbing acid gas from flue gas which comprises supplying water to a moving bed of granular scrubbing material for the purpose of wetting the material, the scrubbing material being capable of reacting with the acid gas to form reaction products on particles of the material, and the moving of the flue gas through the bed so that the acid gas produces the reaction products on the scrubbing material particles.

According to another feature of the present invention, the scrubbing material is recycled after it leaves the moving bed, to separate the finer grain reaction products from larger particles of the scrubbing material, to permit the larger particles to be returned to the bed with fresh scrubbing material to continue the process.

The moving bed is advantageously positioned in the last section or field of a multi-field electrostatic precipitator. In this way, the apparatus and method of the present invention can be retrofit into existing equipment without requiring excessive amounts of additional space.

The reaction products can be separated from the larger particles of scrubbing material to be recycled to the bed, using a fluid bed attritor, a heated pneumatic conveying dryer, a countercurrent flow rotary dryer, or a wet agitation mechanism.

The present invention has several advantages over conventional wet scrubbing techniques for removing acid gases from flue gases, and has additional advantages over earlier methods utilizing fixed and moving scrubbing material beds, which will be discussed in greater detail later in this disclosure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
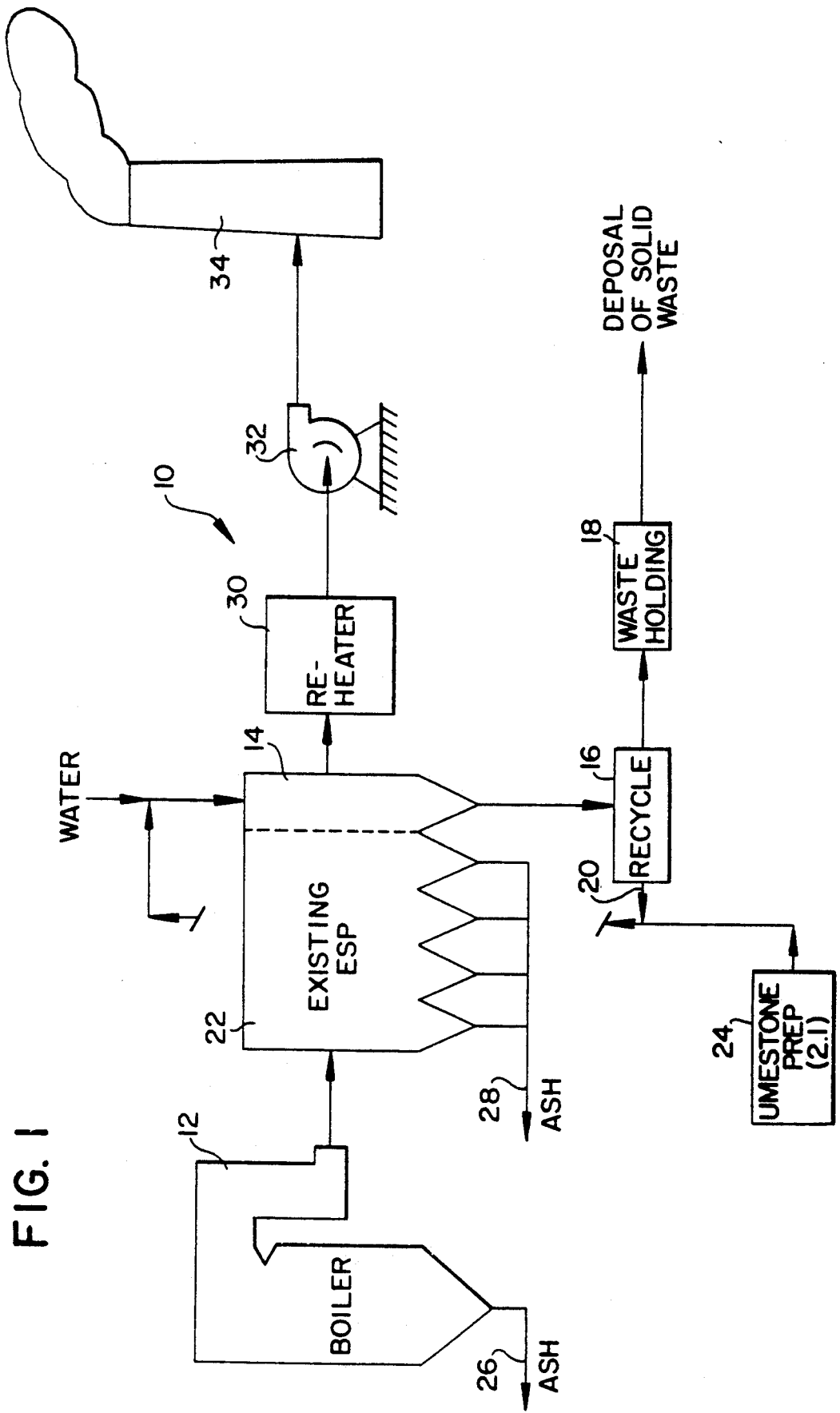
FIG. 1 is a schematic representation of an overall apparatus using the present invention.

Referring to the drawings in particular, the invention embodied in FIG. 1 comprises a method and apparatus 10 by which flue gas from a boiler 12, containing sulfur dioxide or other acid gas, is contacted with moving beds 14 of damp granular limestone solids or other scrubbing material, for the purpose of scrubbing the sulfur dioxide from the flue gas on the surface of the limestone. The reaction products which form on the surface are primarily calcium sulfate and calcium sulfite. When the reactivity of the limestone diminishes below an acceptable level due to the deposition of the reaction products, the damp, granular solids are removed from the moving beds and transported to a dryer/attritor or other recycling means 16. As the granular solids are dried, the reaction products become friable and dusty. The agitating action of the attritor serves to separate these soft, friable solid reaction products from the hard, unreacted limestone particles. Once the reaction products (fines) are dislodged from the coarse limestone particles, separation means exist to separate these two size fractions and discharging the waste over a waste holding mechanism 18. Several means of accomplishing this separation are described later. Once the separation is accomplished, the coarse limestone at 20 is transported back to the top of the moving beds 14 to recycle through the moving beds. The design of the moving beds is such that they can be fitted into one field of a conventional electrostatic precipitator or ESP 22 and, in this way, reduce the cost and space requirements which would be associated with a separate reactor.

Figure 3:
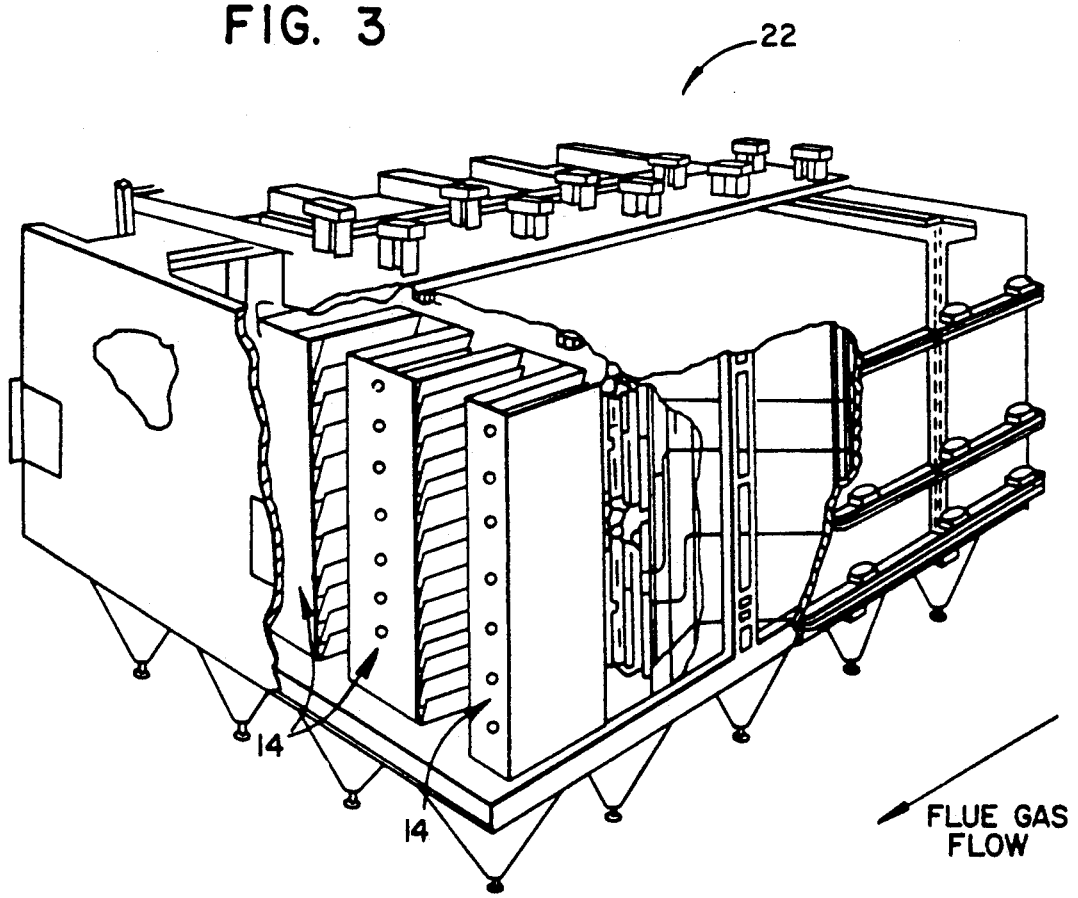
FIG. 3 is a perspective view of an electrostatic precipitator showing the construction of the moving beds in the last field thereof.

In FIG. 1 the moving granular beds of limestone are installed into the last field of the electrostatic precipitator 22 in a manner represented schematically in FIG. 3. Dry, coarse limestone with a size range typically from 3/16-inch top size to fines are fed to the top of the moving beds where they are distributed evenly amongst all of the beds. Simultaneously, water is sprayed onto the limestone by pipes immersed in the moving beds in a manner depicted in FIGS. 9, 10 or 11. Water is sprayed in excess of what is required to keep the bed damp throughout the bed. This is important for several reasons. If any portion of the bed dries out, the potential exists for dust emissions from that section. $SO_2$ removal will diminish significantly in dry regions of the bed. Particulate carryover from the ESP will not be effectively collected by dry regions of the bed. Cementing or agglomeration may also occur where drying is permitted. Typically, the water spray rate is about 10% greater than what is required to completely saturate the flue gas with water.

In the embodiment of FIG. 1, the damp, partially reacted limestone is transported to the regeneration unit where the reaction products are separated from the coarse, unreacted limestone. This regenerated limestone is then mixed with fresh makeup limestone 24, and transported back to the top of the moving bed and distributed to the moving beds.

As shown in FIG. 1, the existing boiler discharges ash in the usual way at outlet 26. The effective fields of ESP 22 also discharged ash at 28 in the usual manner. In addition to removing all equipment from the last field of ESP 22, and replacing it with removing beds 14, a new reheated 30 is added to heat the gases after they leave the ESP 22 by an upgraded fan 32 which supplies this now clean gas to an existing stack 34. This illustrates the convenient and economic retrofitting an existing boiler plants with the present invention.

The flue gas which leaves the moving beds will be cooled to approximately its adiabatic saturation temperature and, therefore, will be saturated with water. Because some $SO_2$ will remain with the flue gas, a corrosion potential exists with respect to the flues, ducts, induced draft fan, and the stack liner. To protect these components from this acid corrosion, the heat exchange 30 is added to raise the flue gas temperature above its adiabatic saturation temperature.

Figure 2:
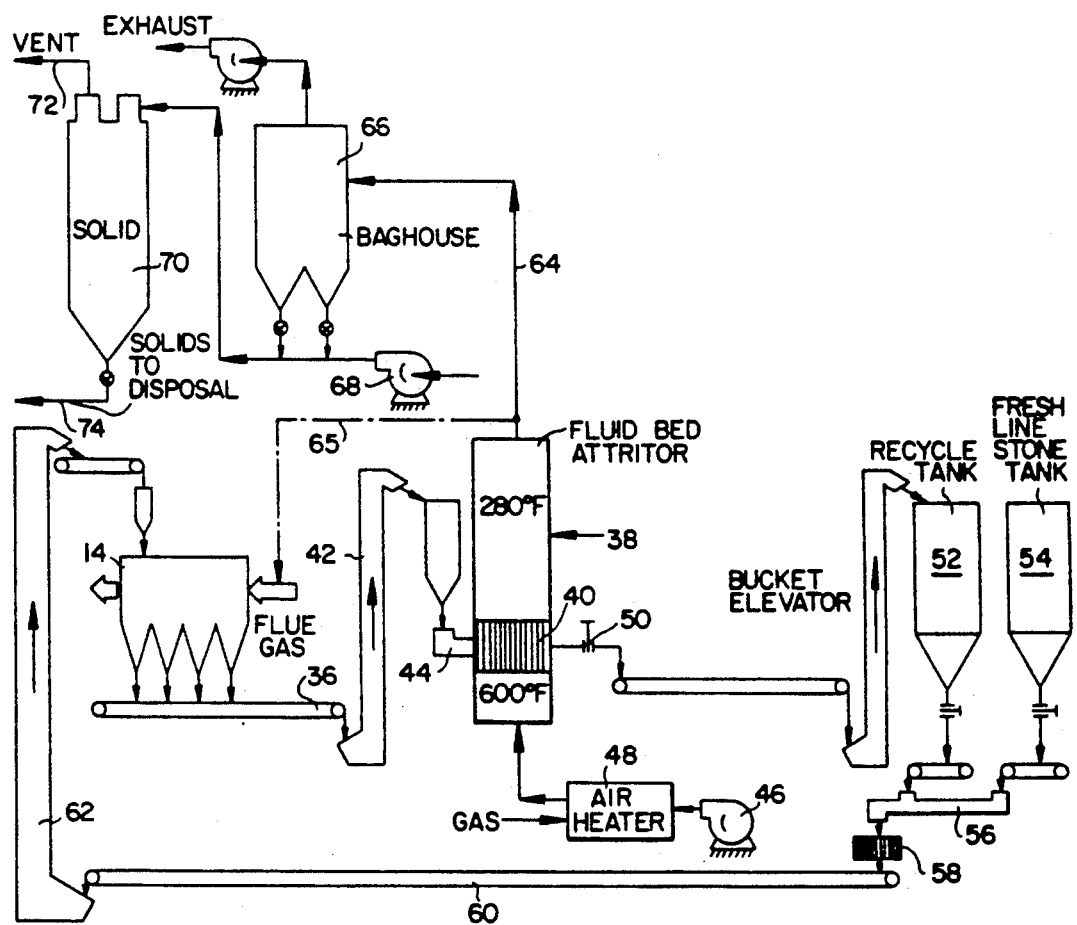
FIG. 2 is a view similar to FIG. 1 showing the recycling circuit for treating and returning scrubbing material to the moving bed.

FIG. 2 is an expanded illustration of the invention in which the preferred embodiment is described in greater detail. The damp, granular solids are fed by a conveyor 36 from multiple beds 14 to a fluidized bed dryer/attritor 38 forming part of the recycle means. These solids will contain typically 2 to 10% free moisture. In this state, these solids will not be free flowing. The solids are fed to the top of a fluidized bed 40 in attritor 38 by a bucket elevator 42 and a feeder 44, where they are dumped onto the bed. The fluidized bed has a depth of one to four feet. The bed is fluidized with air by blower 46, heated to typically 600° to 1000° F. by heater 48. The bed is maintained at a temperature of 125° to 250° F., but usually at about 200° F. The bed temperature is controlled by modulating the fluidizing air temperature. The fluidizing air flow rate is set to achieve the desired fines/coarse particle separation. For example, if all fines generated in the fluidized bed smaller than 30 mesh are to be rejected from the process by elutriation with the fluidizing air, then an air flow rate which would achieve a vertical velocity of about 8 feet per second would be set. The coarse fraction is rejected from the bottom 50 of the bed by gravity. This coarse fraction is dry and fairly flowable. The surface of the limestone is relatively free of reaction products as a result of the scouring action of the fluidized bed 40.

The coarse limestone from the attritor 38 is conveyed by a conveyor and a bucket elevator to an intermediate storage tank 52 which provides a ballast for control of the limestone recycle rate. As limestone inventory becomes depleted by the loss of fines from the attritor, fresh limestone is added to the recycle loop over conveyor 56, screen 58, conveyor 60 and elevator 62, from a fresh limestone tank 54.

The rejection of fines as displayed in FIG. 2 is accomplished by passing the fluidizing air and its entrained solids on line 64 to a baghouse 66 where the solids are separated by simple filtration. These solids will typically contain calcium sulfate, calcium sulfite, unreacted limestone, inerts from the limestone, and small quantities of fly ash.

A conceptual example of the invention for a 500 MW(e) boiler contains twenty moving beds each 35 feet high, 15 feet wide, and approximately 2 feet thick. (Each limestone bed is only 1 foot thick in this example). If two fluid bed attritors are used here to provide the attrition, each would be about 10 feet in diameter with a free board of about 16 feet.

A pneumatic transfer blower 68 conveys the solid particles from the bottom of baghouse 66, to the top of a silo 70 where the solid waste is stored for five days. A vent 72 releases gases from silo 70. Solid waste is disposed of through the bottom outlet line 74 of silo 70. Silo 70 constitutes the waste holding mechanism 18 shown in FIG. 1.

A process alternative entails the elimination of the baghouse used to collect the attrited fines. Instead, this stream, i.e., the attrited fines and fluidizing air, is directed on a line 65 to a point upstream of the electrostatic precipitator and injected into the flue gas. In this way, the electrostatic precipitator acts as the dust collector for both the fly ash from the boiler and the reaction products from the attritor. This eliminates the cost of the baghouse. However, the fly ash and reaction products are now mixed as one waste stream. Some users will prefer to keep these two solid waste streams separated. In that case, the use of the baghouse for collecting the reaction products will be preferred.

Figure 4:
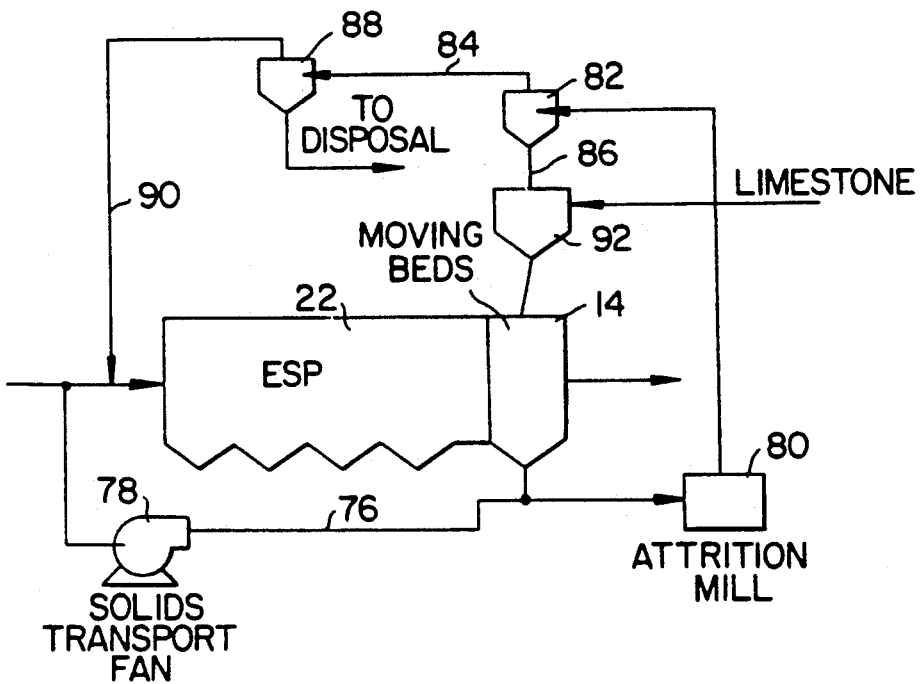
FIG. 4 is a schematic diagram of an alternate embodiment of the invention utilizing a penumatic conveying dryer for separating reaction product particles from scrubbing material particles according to the present invention.

Another process alternative is displayed in FIG. 4. Hot flue gas taken on line 76 from upstream of the ESP 22 is used to contact and dry the damp material discharging from the moving beds 14. In this embodiment, the hot flue gas (which may typically include about 10% of the total flue gas) passes through a fan 78 which supplies the necessary pressure to convey the solids. The solids are, thus, pneumatically conveyed with this flue gas to a point above the moving beds through an attrition mill 80. As the solids and flue gas flow co-currently in the conveying dust, the solids are simultaneously dried and attrited. At the point above the moving beds, a separator 82, preferably a cyclone separator, separates the fines 84 from the coarse fraction 86. The fines are transported with the flue gas from the separator and are either collected in a dedicated dust collector 88 or are directed over line 90 to the ESP inlet and injected into the flue gas and are, thus, collected by the ESP 22. The coarse fraction 86 flows by gravity from the cyclone separator to the moving beds over scrubbing material supply means 92.

Other alternatives exist for attriting the fines from the coarse fraction and separating these two cut sizes. The two methods described above were the fluid bed of FIG. 2 and the heated pneumatic conveying dryer of FIG. 4.

Figure 5:
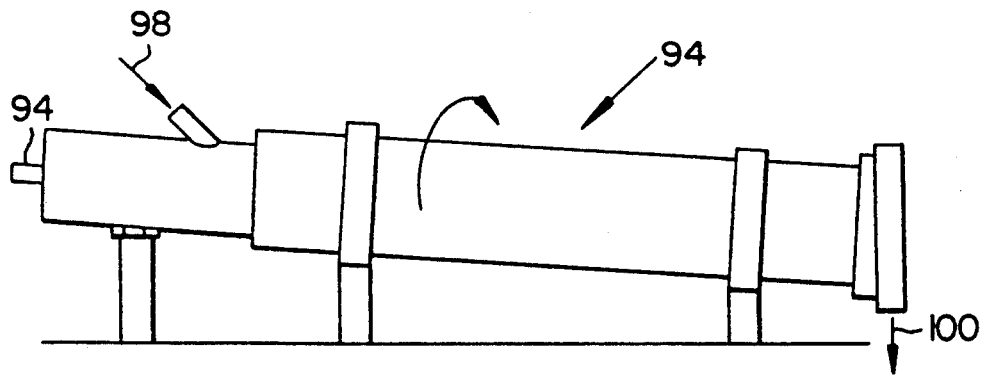
FIG. 5 is a conventional side elevational view of a countercurrent rotary dryer used for separating particles according to a further embodiment of the invention.

Another method for drying and attriting the wet solids is an air-swept, countercurrent rotary dryer like that depicted in FIG. 5. Hot air from a burner 94 passes through the dryer 96 at such a velocity as to convey the fines input at 98 from the dryer. The coarse material leaves the dryer by gravity at 100.

Figure 6:
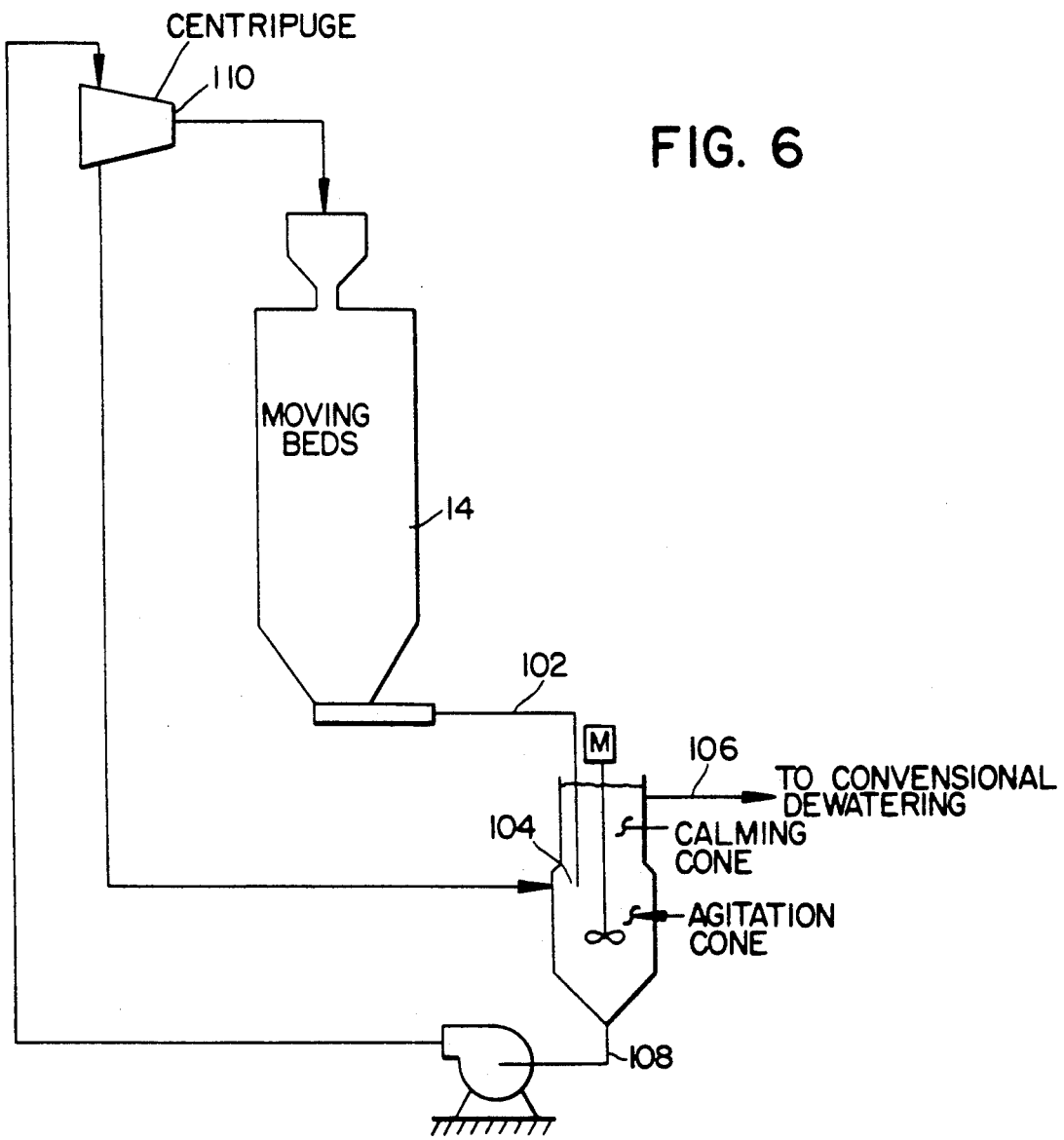
FIG. 6 is a schematic diagram showing a further embodiment of the invention using a wet agitation tank to separate reaction product particles from scrubbing material particles.

Another process alternative for separating the reaction products from the unreacted limestone shown in FIG. 6, involves a basic departure from the drying/attriting process. In this alternative, the damp material 102 leaving the moving bed 14 would not be dried at all but, rather, would be separated by washing followed by some wet separation technique. For example, the damp solids from the moving beds could be dumped into an agitated tank 104 of water where the reaction products would be easily separated from the limestone. The mixture could then be separated by elutriation of the fines out the top 106 of the tank for disposal of the fine solids. The coarse fraction 108 could then be pumped to an elevation above the moving beds where they would be dewatered by simple filtration or a centrifuge 110 and then fed by gravity back to the moving beds. The advantage of this approach is that the thermal energy penalty required to dry the solids in the other embodiments is avoided. Also, the moving of solids around the recycle loop may be simpler (pumping rather than conveyors). The primary disadvantages of this approach are, first, the fines must be dewatered and discarded as a wet cake. Secondly, the uniform distribution of damp, coarse limestone solids at the top of the moving beds will be more difficult.

The placement of moving beds in the confined space of one field of an electrostatic precipitator requires unique adaptations as shown in FIG. 3. The space for these moving beds 14 is made available by removing all of the electrical and mechanical components from that field, thus, leaving an empty volume which is typically 10 to 15 feet long (in the direction of gas flow). In the 500 MW case described previously, the empty cavity would be 20 feet long, 35 feet high, and 200 feet wide. In this application, twenty moving beds, each 15 feet long and 35 feet high, would be required. One means of arranging the moving beds in a portion of the empty cavity was depicted in FIG. 3. The flue gas flows down the lane 112 between the moving beds and through the beds in a manner shown in FIG. 7. This plan view shows the flue gas flowing between the lanes created by neighboring beds 14. The flue gas then splits with a portion flowing through the moving bed on the left and a portion through the right. The pressure drop across the moving beds is large compared to the pressure drop in the lanes. Therefore, the flow distribution across the moving beds will be uniform to the lanes 114 on the cool or outlet side of the beds.

Figure 12:
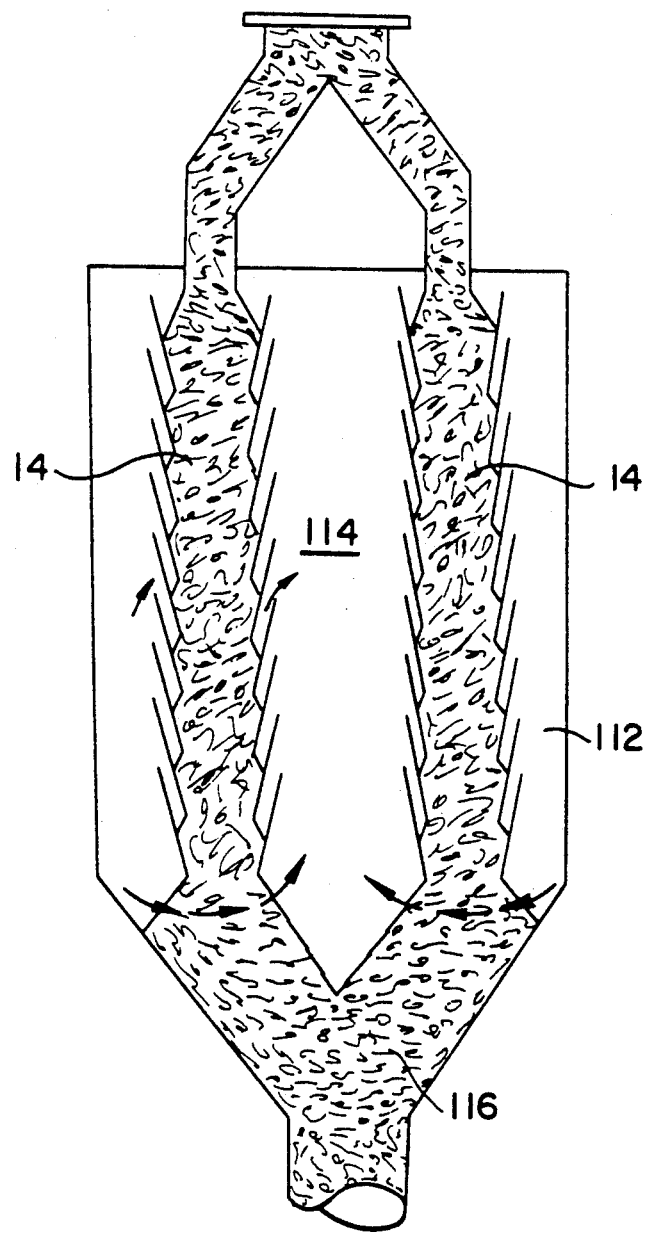
FIG. 12 is a vertical sectional view of two moving beds of the invention, showing how the flue gases pass through the bed.

The seal between the hot flue gas side and the lower pressure side at the bottom of the moving beds is established naturally by the granular bed material itself. That is displayed in FIG. 12 where the solids, owing to their inherent flow properties, create a farrow 116 below the moving bed 14. The flue gas can, therefore, pass from the high pressure, hot gas side 112 to the low pressure, cool gas side 114. In so doing, the flue gas-solids contact is just as effective here as in the moving bed itself.

Figure 7:
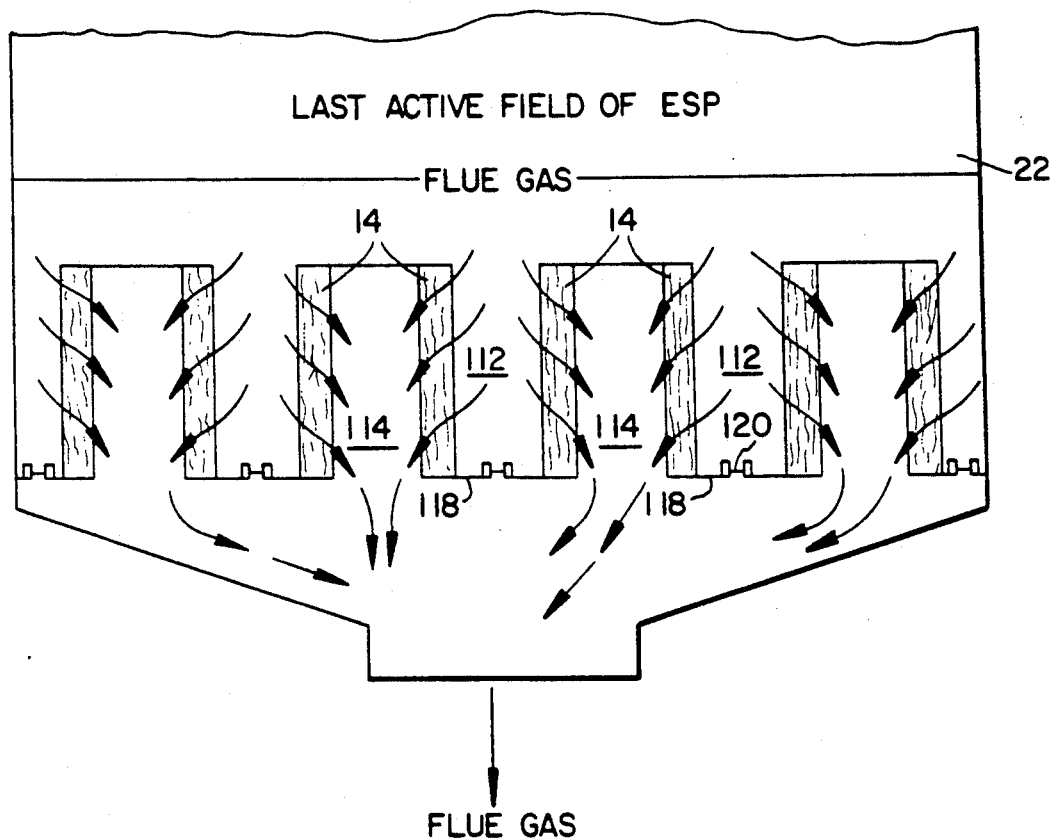
FIG. 7 is a top plan view of multiple moving beds positioned in the last field in the electrostatic separator according to the present invention.
Figure 8:
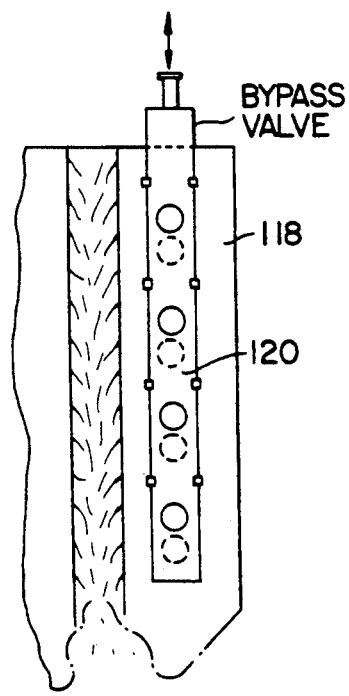
FIG. 8 is a fragmentary side elevational view of a bypass valve used for the bypass of a portion of the flue gases around the moving beds.

The moving bed arrangement described above lends itself to a new and novel means of facilitating flue gas bypass around the moving beds. This method is illustrated in FIGS. 7 and 8. Here, a means is provided where flue gas can flow through the lane between two moving beds and discharge a portion of the gas across controlled openings in the flat wall 118 which defines the end of the lane. For example, suppose that a particular system was required to achieve an $SO_2$ reduction of 90%. And suppose that the moving beds were removing 100% of the flue gas passing through the beds. The operator then may choose to divert (bypass) 10% of the flue gas around the moving beds. The operator could do this by opening the bypass valve 120 as shown in FIG. 8. This hot, dry flue gas would then mix with the gases which passed through the moving beds and, in this way, decrease the relative humidity and corrosion potential of the total flue gas stream. Valve 120 is a plate with multiple holes which can be slid up and down to align with holes in wall 118.

Figure 11:
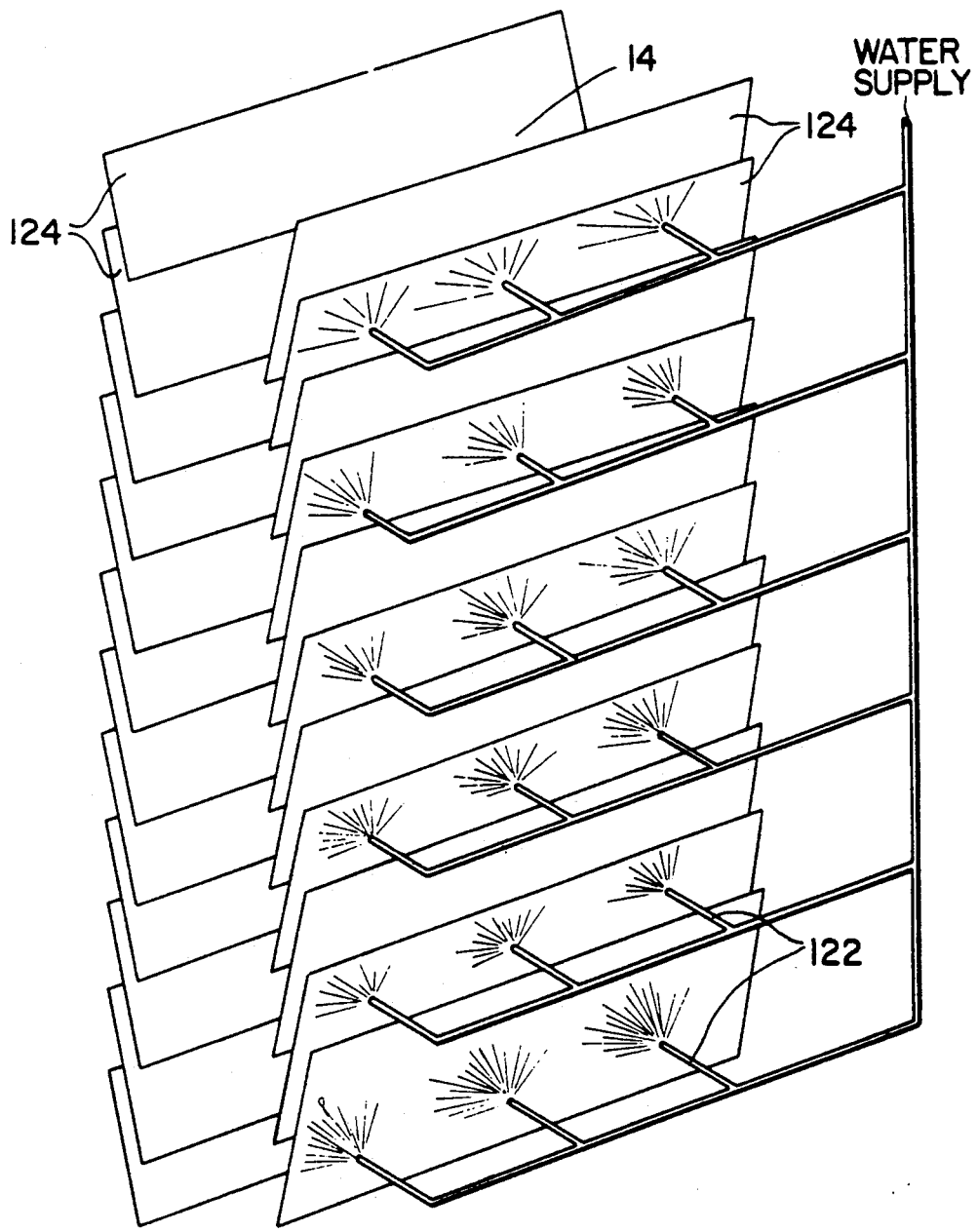
FIG. 11 is a perspective view of an alternate embodiment for wetting the granular material.

A fundamental aspect of this process is that the limestone surface must be wet with liquid water to facilitate the reactions between the acid gases and the alkaline limestone. Without liquid water, the reaction rate is too slow to achieve significant $SO_2$ removal. Two approaches exist for achieving this state. Either the flue gas can be humidified with a spray of water directly into the flue gas, or the limestone bed can be directly wetted by a water spray. If the latter approach is used, sufficient water must be used to overcome the evaporation which takes place when the hot flue gases pass through the moving bed. Several means exist for wetting the bed material and/or flue gas. Humidification of the flue gas by spraying water into the flue gas directly would work satisfactorily if space exists upstream of the moving beds to complete the evaporation. However, with practical, commercially available atomizers operating at reasonable energy levels, at least one second of residence time is required. In the ESP retrofit situation, this much space is unlikely to be available. Another approach would be to place a bank of spray nozzles in the lanes between the moving beds and spray the beds uniformly over the entire surface area as depicted in FIG. 11. In this approach, the sprays 122 are placed at either the inlet 112 or outlet lanes 114 of the moving beds 14.

No attempt is made here to achieve complete evaporation in the gas space. Rather, the slats 124 of the moving bed receive the spray directly and act as a wetted surface for contact with the flue gas. The water which doesn't evaporate flows by gravity along the slats to the granular bed material and thereby wets it. This water spray could be placed either on the hot, high pressure side or on the cooler downstream side. Each has certain advantages and disadvantages noted as follows: The advantage of the upstream spray is that the flue gas and water flow co-currently so that the motion of the gas will help carry the excess moisture through the granular bed, thus, aiding wetting of the entire bed cross-section. The disadvantage of the spray location is that a significant amount of the evaporation will take place on the slats. The problem with this is that dissolved solids in the spray water will build up on the slats, producing a potential cleaning and pluggage problem. The advantage of the downstream spray is that essentially all of the evaporation will take place in the bed itself, thus, reducing concern for pluggage on the moving bed slats. The disadvantages of this approach are that the wetting of the granular material will be more difficult because the water must flow counter to the motion of the flue gas and the potential of liquid carryover from the moving beds is heightened. However, the degree to which the flue gas flow impedes the motion of the water flow will be minor since the superficial velocity of the gas is typically less than 2 feet per second.

Figure 9:
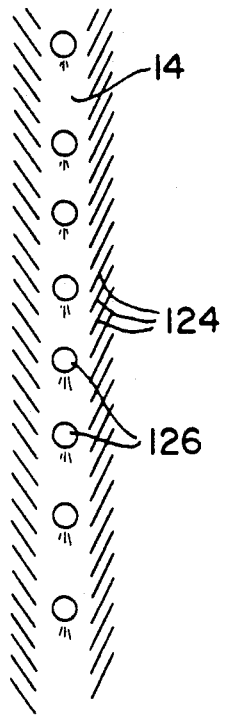
FIG. 9 is a vertical sectional view of one embodiment of the invention for wetting the particles of granular scrubbing material in the moving bed.
Figure 10:
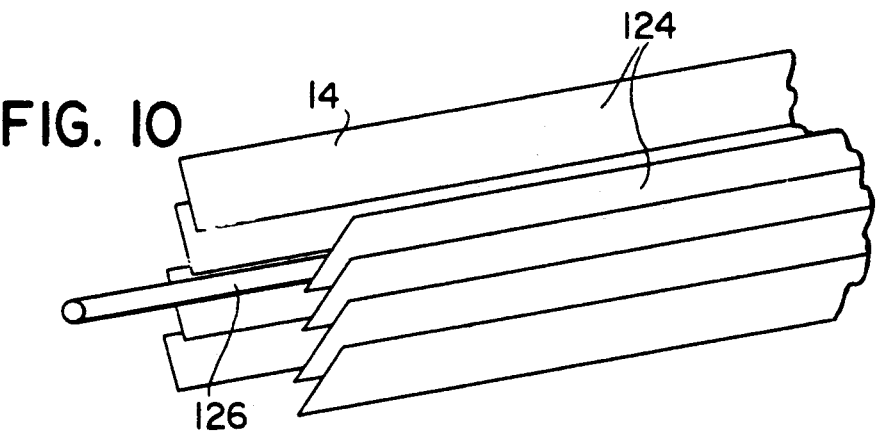
FIG. 10 is a partial side view of FIG. 9.

An alternate means for wetting the bed was illustrated in FIGS. 9 and 10. Here the bed is wetted by a series of "irrigation" pipes 126 immersed directly in the moving beds. The water spray rate is controlled to exceed that which is required to completely saturate the flue gas by about 10% or so. In this way, the bed material remains wet throughout. The reason the water is injected at several levels, rather than injecting all of the water at the top, is to prevent flooding the top of the bed. This condition would cause the flue gas to divert gas away from the top. The water sprayed in the manner described here wets the entire width of the bed by the random deflections the water experiences as it flows by gravity vertically down the bed.

The louvered slat arrangement described so far is more or less classical. Details of design and implementation, however, of the louver-based moving bed are typically special case situations because solids handling problems invariably require special tailoring of the equipment design. However, several bed designs are possible.

Figure 13:
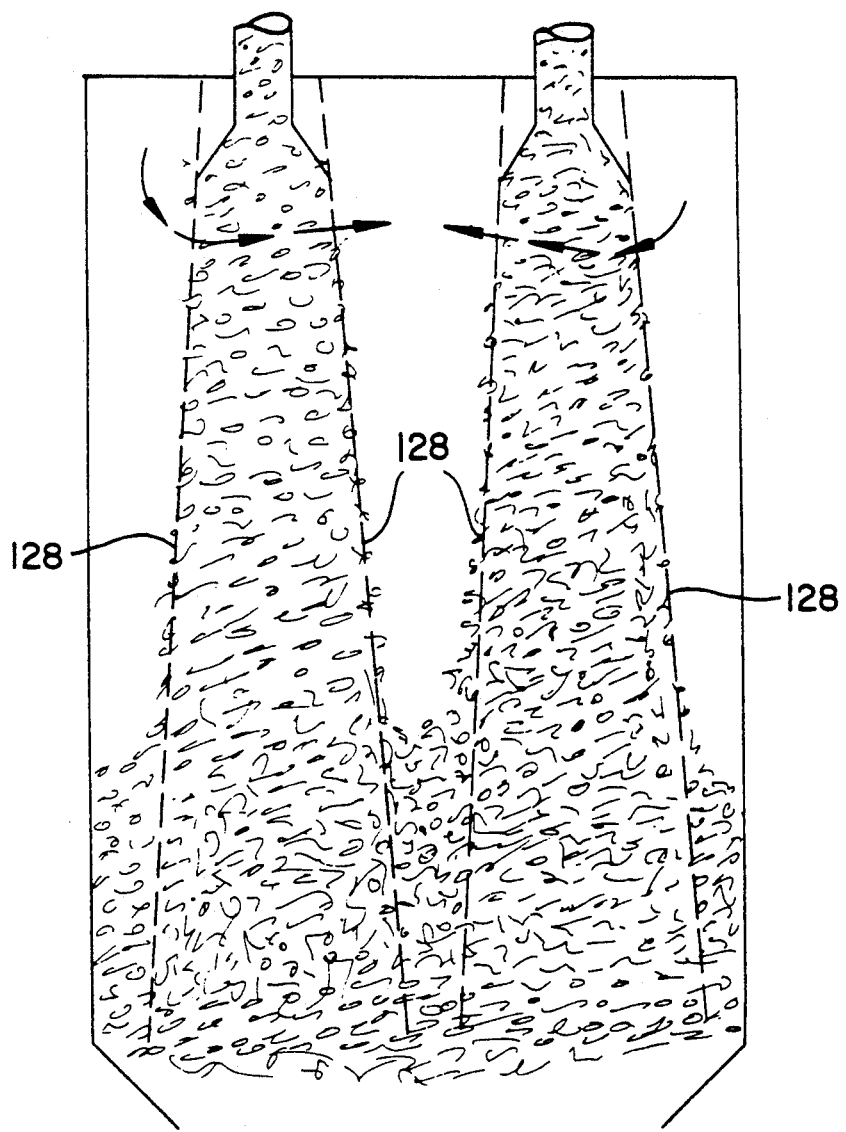
FIG. 13 is a view similar to FIG. 12 showing an alternate struction for confining the moving beds in the apparatus.

FIG. 13 depicts a moving bed design where the slats are replaced with perforated plates 128 which are both tilted outwardly. Thus, the flow path is longer at the bottom than at the top. The advantages are: the solids should be less susceptible to "hang up" in the bed since there are no "ledges" as in the conventional design, and this design would be less expensive since the perforated plates would use about ⅓ less material.

Figure 14:
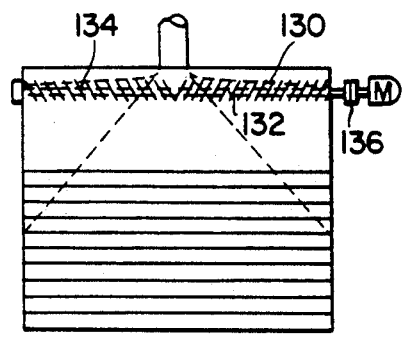
FIG. 14 is a side elevational view showing one mechanism for distributing scrubbing material across the top of a moving bed.

The conventional design for distributing solids to the top of the moving beds is to use a tree-structured series of tanks and pipes. This requires a significant amount of hardware and head room. One approach to improving the task of distributing the recycled granular solids is to use one receiver tank per two moving beds. Each moving bed receives solids from a tripper conveyor. The solids flow to the two moving beds by gravity and enter the top of each bed at a center point. Since the solids must be more-or-less uniformly distributed across the top on the moving bed, a special screw 130 is used in which the flights 132 and 134 are designed to move solids radially outwardly in both directions as shown in FIG. 14. The screw turns through a slip clutch 136. When the screw becomes immersed in the bed material, i.e., when the solids cover a substantial portion of the screw, the turning torque exceeds the present slip clutch value and the screw ceases turning until the level falls below the screw, at which time the screw begins turning again.

Figure 16:
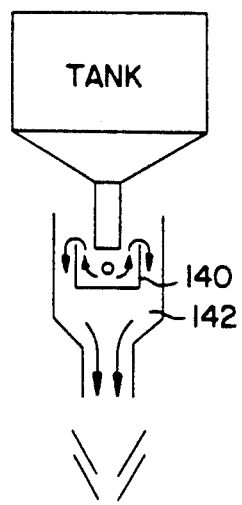
FIG. 16 is a vertical sectional view of FIG. 15.
Figure 15:
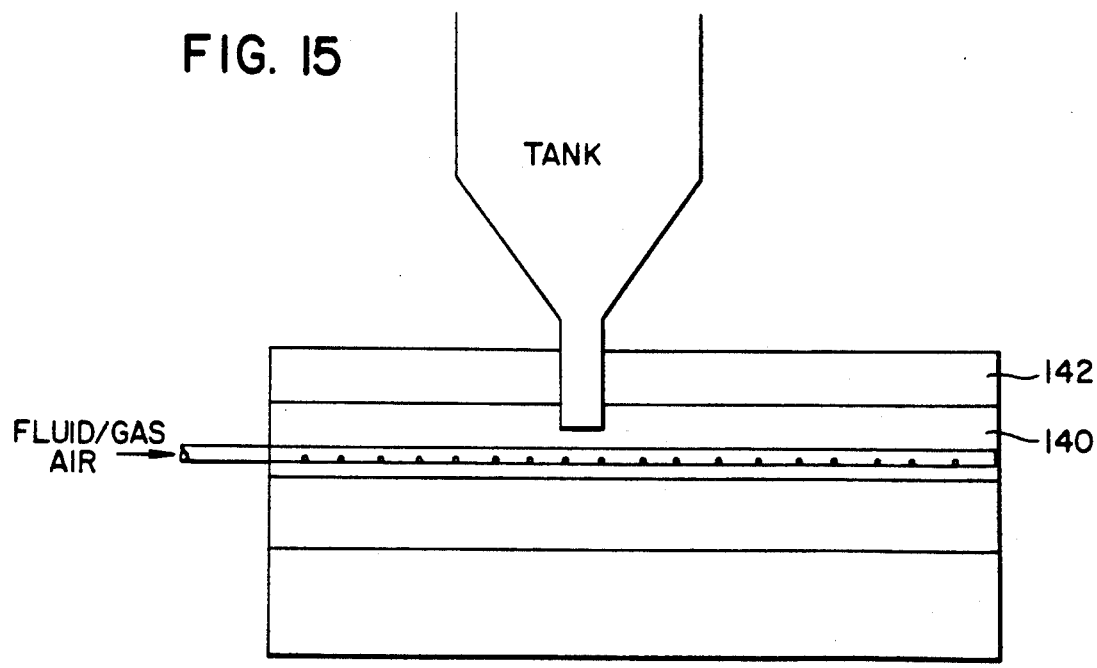
FIG. 15 is a view similar to FIG. 14 showing an alternate embodiment for distributing the material across the top of each moving bed.

Another approach to spreading the granular solids at the top of the moving beds is to feed the solids from a tank to the center point of a trough 140 which is fluidized. The state of fluidization insures that the solids spread uniformly along the length of the trough. The solids spill over the edge of the trough and into a bin 142 that runs the length of the moving bed. This is presented in FIGS. 15 and 16.

One appropriate method of identifying the advantages of this invention is to compare it to conventional limestone-based wet scrubbing. This comparison is presented in the following table:

| | COMPARISON OF GRANULAR BED WITH WET SCRUBBING | |
|---|---|---|
| | Granular Moving Bed | Wet Scrubbing |
| Limestone Preparation | Dry crushing to 3/16" by 0 | Wet milling to at least 80% minus 200 mesh |
| Flue Gas Contactor: | | |
| Materials of const. | Mild steel | Moderately noble alloys |
| Gas side pressure drop to achieve 90% efficiency | 2-3" w.g. | 5-7" w.g. |
| Recirculation load (lb/1000 ACF) | 2-9 | 250-1020 |
| Particulate collection capability | 90-95% | Approximately 0% |
| Fresh water requirements | None | Pump seals Mist eliminators |
| Waste Handling: | | |
| Dewatering requirements | None | Thickener-filter |
| Moisture content | Zero | 15-50% |

Some specific advantages of this invention in comparison to the three patents noted above are summarized as follows:

The fitting of the moving beds into the last field of an electrostatic precipitator provides the user a means of adding a flue gas desulfurization apparatus into the plant without the use of significant land space. This is important for electric utilities which must retrofit such equipment into old power plants where little room remains for expansion.

The positioning of the moving beds in the last field will aid particulate collection.

Spraying water directly into the bed has several advantages, including:
  a. The wet-dry interface will occur within the bed, thus, preventing corrosion and fouling of stationary surfaces.
  b. The spray does not need to be finely atomized, thus, saving significant energy expense.
  c. The space which would otherwise be required for the humidification is eliminated.

The adaptation of an external fluidized bed as an attritor has several advantages, including the following:

a. the fluidized bed can act as both an attritor and dryer.
b. The fluid bed can be sized to minimize the amount of drying air, thereby minimizing the size and cost of the dust collector used to collect the fines.
c. The fluid bed can be sized to provide a sharp cut size for the fines and coarse streams.

The means depicted in FIGS. 7 and 8 for bypassing flue gas around the moving beds has the following advantages: The remixing of bypass gas with the cleaned gases will be inherently intimate because of the proximity and momentum of the bypass gas relative to the cleaned gas.

The means for wetting the flue gas as depicted in FIG. 11 would insure complete wetting of the limestone at the outlet of the moving beds, but would still insure that the wet-dry interface was internal to the bed.

The alternative moving bed design depicted in FIG. 13 has the advantages of simplicity, cost, and lower susceptibility to hang-up of bed material.

While specific embodiments of the invention have been shown and described in detail to illustrate the application of the principles of the invention, it will be understood that the invention may be embodied otherwise without departing from such principles.

What is claimed is:

1. A method of scrubbing sulfur oxides from a flue gas comprising the steps of:
   providing a moving bed of granular limestone scrubbing material capable of reacting with the sulfur oxides to form reaction products on particles of the granular limestone scrubbing material in contact with the flue gas;
   positioning the moving bed in a field of a multiple field electrostatic precipitator with the electrical and mechanical components removed from that field;
   supplying the flue gas to at least one of the fields of the electrostatic precipitator before it reaches the moving bed;
   supplying water to the moving bed of granular limestone scrubbing material for wetting the moving granular limestone scrubbing material with an amount of water in excess of that needed to keep the moving bed damp;
   passing the flue gas through the moving bed of wet granular limestone scrubbing material located in the electrostatic precipitator for reacting the sulfur oxides with the material to form the reaction products on particles of the material; and
   collecting the granular limestone scrubbing material from a bottom of the moving bed for recycling a portion of the granular limestone scrubbing material back to the moving bed.

2. A method according to claim 1 including supplying at least 10% more water to the moving bed than is necessary to completely saturate the moving bed.

3. A method according to claim 1 including separating the reaction products from particles of the scrubbing material after flue gas has passed through the moving bed to form regenerated particles of scrubbing material.

4. A method according to claim 3 including separating the reaction products by supplying the scrubbing material to a fluidized bed attritor.

5. A method according to claim 3 including conveying the scrubbing material through a heated pneumatic conveyor dryer for separating the reaction products from the scrubbing material.

6. A method according to claim 3 including supplying the scrubbing material to a countercurrent flow rotary dryer for separating the reaction products from the scrubbing material.

7. A method according to claim 3 including subjecting the scrubbing material to wet agitation for separating the reaction products from the scrubbing material.

8. A method according to claim 3 including pneumatically conveying the reaction products after they are separated from the scrubbing material, to a baghouse for separating the reaction products from gas for conveying the reaction products.

9. A method according to claim 1 including positioning the moving bed in the last field of the multiple field electrostatic separator.

10. A method according to claim 1 including reheating the flue gas after it leaves the moving bed to at least above an adiabatic saturation temperature for the flue gas.

11. A method according to claim 1 including bypassing a portion of the flue gas around the moving bed and recombining the bypassed portion of the flue gas with flue gas which has passed through the moving bed for maintaining the flue gas at a temperature above an adiabatic saturation temperature thereof.

* * * * *